US012243246B2

(12) United States Patent
Huang et al.

(10) Patent No.: US 12,243,246 B2
(45) Date of Patent: Mar. 4, 2025

(54) IMAGE PROCESSING METHOD AND RELATED VIDEO PROCESSOR

(71) Applicant: NOVATEK Microelectronics Corp., Hsin-Chu (TW)

(72) Inventors: Yi-Hung Huang, Hsinchu County (TW); Hsiao-En Chang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 409 days.

(21) Appl. No.: 17/949,238

(22) Filed: Sep. 21, 2022

(65) Prior Publication Data

US 2024/0095933 A1    Mar. 21, 2024

(51) Int. Cl.
*G06T 7/246* (2017.01)
*G06T 7/223* (2017.01)

(52) U.S. Cl.
CPC .............. *G06T 7/248* (2017.01); *G06T 7/223* (2017.01); *G06T 2207/10016* (2013.01)

(58) Field of Classification Search
None
See application file for complete search history.

(56) References Cited

U.S. PATENT DOCUMENTS

| 8,600,178 | B1* | 12/2013 | Woodall | H04N 19/527 |
| | | | | 382/236 |
| 2010/0329343 | A1* | 12/2010 | Wu | H04N 19/521 |
| | | | | 375/E7.123 |
| 2011/0141349 | A1* | 6/2011 | Albuz | H04N 5/145 |
| | | | | 348/E7.003 |
| 2023/0388484 | A1* | 11/2023 | Gao | H04N 19/117 |

* cited by examiner

*Primary Examiner* — Vikkram Bali
(74) *Attorney, Agent, or Firm* — Winston Hsu

(57) ABSTRACT

An image processing method for a video processor, for generating an extrapolated frame according to a previous frame and a current frame, includes steps of: projecting a plurality of motion vectors (MVs) to the extrapolated frame subsequent to the current frame; determining whether a block of the extrapolated frame is projected by at least two of the MVs; selecting at least two candidate MVs from the MVs projected to the block when the block is projected by at least two of the MVs; calculating a blended MV which is a mixture of the at least two candidate MVs, and projecting the blended MV to the previous frame; obtaining a reference MV corresponding to position of the previous frame projected by the blended MV; and comparing the reference MV with the at least two candidate MVs, to select a final MV for the block from the at least two candidate MVs.

24 Claims, 7 Drawing Sheets

IMAGE PROCESSING METHOD AND RELATED VIDEO PROCESSOR

BACKGROUND OF THE INVENTION

1. Field of the Invention

The present invention relates to an image processing method for a video processor, and more particularly, to an image processing method of extrapolation for a video processor.

2. Description of the Prior Art

Motion estimation and motion compensation (MEMC) is a technology used for frame interpolation, which allows a series of image frames to be displayed with a higher frame rate. For example, if a 30 Hz source video such as a film is required to be displayed in 60 Hz, an interpolated frame should be added between every two adjacent input frames of the source video, so as to double the frame rate. The images of the interpolated frame may be predicted by using motion vectors (MVs) between a current input frame and a previous input frame, so as to display the output video smoothly.

Since the interpolated frame should be produced based on the information of the current input frame and the previous input frame but displayed before the current input frame, a longer frame delay is unavoidable. In order to reduce the frame delay, a frame extrapolation scheme is introduced in this art, where a produced extrapolated frame is displayed after the current input frame. The images of the extrapolated frame may also be predicted and generated by using the MEMC technology.

The MEMC for frame interpolation or extrapolation is requested to handle "cover" and "uncover" situations when foreground and background objects cross each other. The "cover" means a foreground object covers the background, and the "uncover" means the background originally covered by a foreground object appears in the produced frame. In the conventional interpolation case, a correct image in the cover and uncover areas of the interpolated frame may be found in the previous input frame previous to the interpolated frame or the current input frame later than the interpolated frame by using a correct MV. However, in the frame extrapolation, it is not easy to handle the cover and uncover situations since there is no reference frame later than the extrapolated frame. In the cover area, there may usually be multiple MVs projected to a position. If the cover situation is not well handled, the foreground object may be broken in the extrapolated image. In the uncover area, there may be no MV projected to a position. If the uncover situation is not well handled, an unwanted object may appear in the extrapolated image.

Thus, there is a need to provide a novel image processing method to find correct MVs for the cover and uncover situations in extrapolation, in order to generate accurate extrapolated images.

SUMMARY OF THE INVENTION

It is therefore an objective of the present invention to provide an image processing method for extrapolation, so as to solve the abovementioned problems.

An embodiment of the present invention discloses an image processing method for a video processor, for generating an extrapolated frame according to a previous frame and a current frame. The method comprises steps of: projecting a plurality of motion vectors (MVs) to the extrapolated frame subsequent to the current frame; determining whether a block of the extrapolated frame is projected by at least two of the plurality of MVs; selecting at least two candidate MVs from the MVs projected to the block when the block is projected by at least two of the plurality of MVs; calculating a blended MV which is a mixture of the at least two candidate MVs, and projecting the blended MV to the previous frame; obtaining a reference MV corresponding to a position of the previous frame projected by the blended MV; and comparing the reference MV with each of the at least two candidate MVs, to select a final MV for the block from the at least two candidate MVs.

Another embodiment of the present invention discloses a video processor, which is configured to generate an extrapolated frame according to a previous frame and a current frame by performing steps of: projecting a plurality of MVs to the extrapolated frame subsequent to the current frame; determining whether a block of the extrapolated frame is projected by at least two of the plurality of MVs; selecting at least two candidate MVs from the MVs projected to the block when the block is projected by at least two of the plurality of MVs; calculating a blended MV which is a mixture of the at least two candidate MVs, and projecting the blended MV to the previous frame; obtaining a reference MV corresponding to a position of the previous frame projected by the blended MV; and comparing the reference MV with each of the at least two candidate MVs, to select a final MV for the block from the at least two candidate MVs.

Another embodiment of the present invention discloses an image processing method for a video processor, for generating an extrapolated frame according to a previous frame and a current frame. The method comprises steps of: projecting a plurality of MVs to the extrapolated frame subsequent to the current frame; determining whether a block of the extrapolated frame is projected by any of the plurality of MVs; finding a first candidate MV and a second candidate MV corresponding to the block when the block is projected by none of the plurality of MVs; calculating a blended MV which is a mixture of the first candidate MV and the second candidate MV, and projecting the blended MV to the previous frame; obtaining a reference MV corresponding to a position of the previous frame projected by the blended MV; and comparing the reference MV with the first candidate MV and the second candidate MV, to select a final MV for the block from the first candidate MV and the second candidate MV.

Another embodiment of the present invention discloses a video processor, which is configured to generate an extrapolated frame according to a previous frame and a current frame by performing steps of: projecting a plurality of MVs to the extrapolated frame subsequent to the current frame; determining whether a block of the extrapolated frame is projected by any of the plurality of MVs; finding a first candidate MV and a second candidate MV corresponding to the block when the block is projected by none of the plurality of MVs; calculating a blended MV which is a mixture of the first candidate MV and the second candidate MV, and projecting the blended MV to the previous frame; obtaining a reference MV corresponding to a position of the previous frame projected by the blended MV; and comparing the reference MV with the first candidate MV and the second candidate MV, to select a final MV for the block from the first candidate MV and the second candidate MV.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
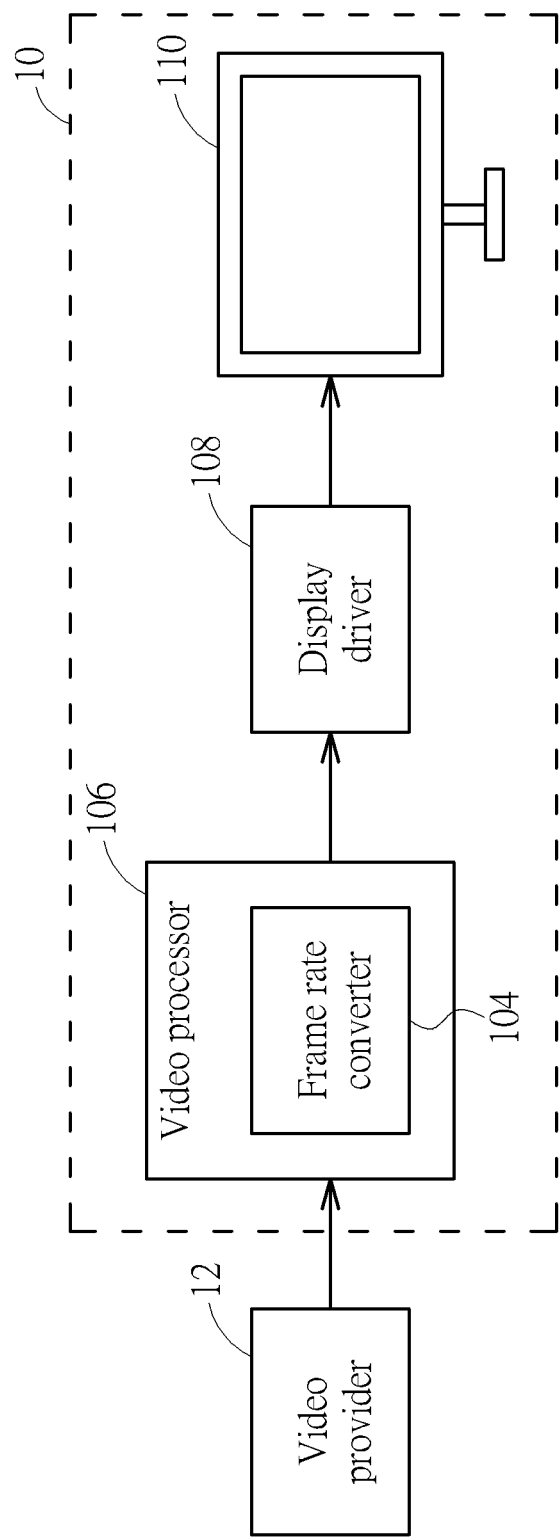
FIG. 1 is a schematic diagram of a display system according to an embodiment of the present invention.

FIG. 1 is a schematic diagram of a display system 10 according to an embodiment of the present invention. As shown in FIG. 1, the display system 10 such as a television (TV) may receive and display a source video having a series of image frames provided by a video provider 12 such as a DVD player or a video streaming service provider communicated with the display system 10 via a wired network or a wireless network. The display system 10 includes a video processor 106, a display driver 108 and a display panel 110. In general, the frame rate of the source video may not be the same as the frame rate to be displayed on the display panel 110. The video processor 106 may include a TV controller integrated circuit (IC) and/or a frame rate conversion (FRC) IC for converting the source video which usually has a lower frame rate to generate a series of output frames of a higher frame rate to be displayed by the display panel 110. Or, the video processor 106 may be a TV controller IC embedded with a function of FRC. That is, the frame rate converter 104 depicted in FIG. 1 can be regarded as a stand-alone FRC IC or an internal FRC circuit inside the TV controller IC. For example, when receiving a 24-Hz input video having two input frames A and B, the frame rate converter 104 may convert the 2 input frames A and B into 5 image frames A, A, A, B, B in 60 Hz, and perform motion estimation and motion compensation (MEMC) to generate appropriate interpolated or extrapolated frames based on these input frames.

In another embodiment, the video processor 106 may include a graphics processing unit (GPU) and a stand-alone FRC IC, or, the video processor 106 may be a GPU with the internal FRC circuit inside the GPU.

The display driver 108 may convert the image data into data voltage signals and drive the display panel 110 to display the image frames through the data voltage signals. The display driver 108 may include a timing controller, a source driver, a gate driver, and/or any other devices capable of driving the display panel 110. The display panel 110 may be of any type such as a liquid crystal display (LCD) panel, light-emitting diode (LED) display, and plasma display panel (PDP), but not limited thereto.

Figure 2:
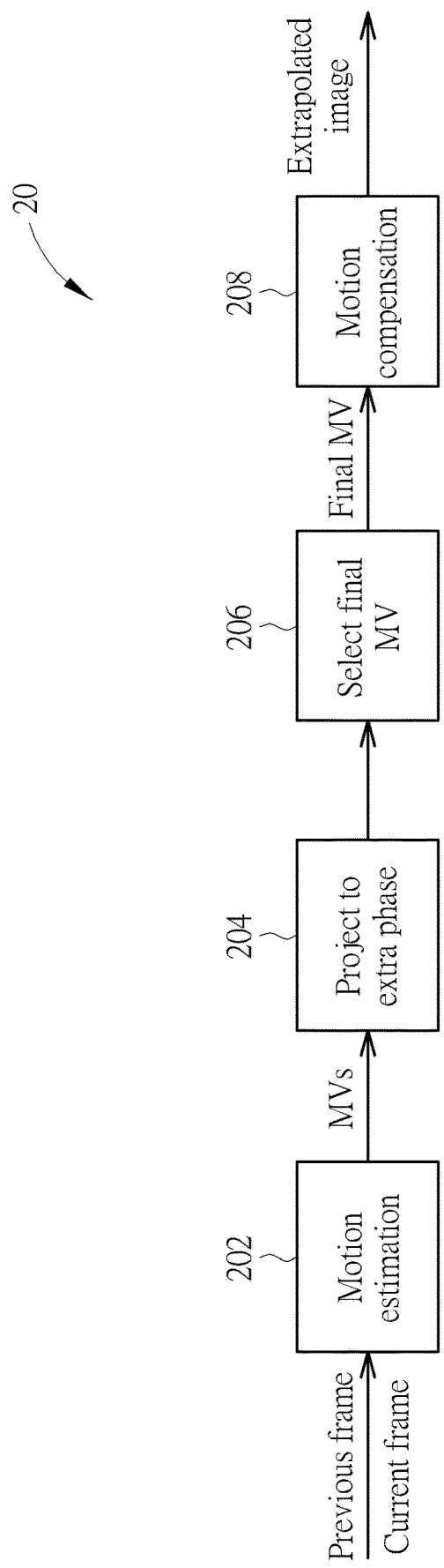
FIG. 2 is a flowchart of an image processing process according to an embodiment of the present invention.

FIG. 2 is a flowchart of an image processing process 20 according to an embodiment of the present invention. The image processing process 20 may be implemented in a video processor, such as the video processor 106 shown in FIG. 1, for generating an extrapolated frame based on a previous input frame (abbreviated as previous frame hereinafter) and a current input frame (abbreviated as current frame hereinafter). As shown in FIG. 2, the image processing process 20 includes the following steps:

Step 202: Perform motion estimation to generate a plurality of motion vectors (MVs) at the previous frame and the current frame.

Step 204: Project the plurality of MVs to an extrapolation phase for generating an extrapolated frame.

Step 206: Select a final MV for each block of the extrapolated frame.

Step 208: Perform motion compensation according to the final MV to generate the extrapolated image.

According to the image processing process 20, the video processor is configured to perform MEMC to generate the extrapolated frame. The video processor 106 first performs motion estimation to generate multiple MVs, which may include forward MVs at the previous frame and backward MVs at the current frame. The MVs are projected to an extrapolation phase corresponding to an extrapolated frame subsequent to the current frame. Preferably, since the extrapolated frame is closer to the current frame (than the previous frame), it is preferable to project the backward MVs of the current frame to the extrapolation phase. Each block of the extrapolated frame may be projected by any number of MVs. As mentioned above, if the block is in a "cover" area, it may be projected by multiple MVs, and one of these MVs is selected as the final MV for motion compensation. If the block is in an "uncover" area, it may not be projected by any MV, and thus an additional projection method is used to find the final MV for the block.

After the final MV of each block of the extrapolated frame is found, the video processor may perform motion compensation based on the final MV, to generate the images in the extrapolated frame.

Figure 3:
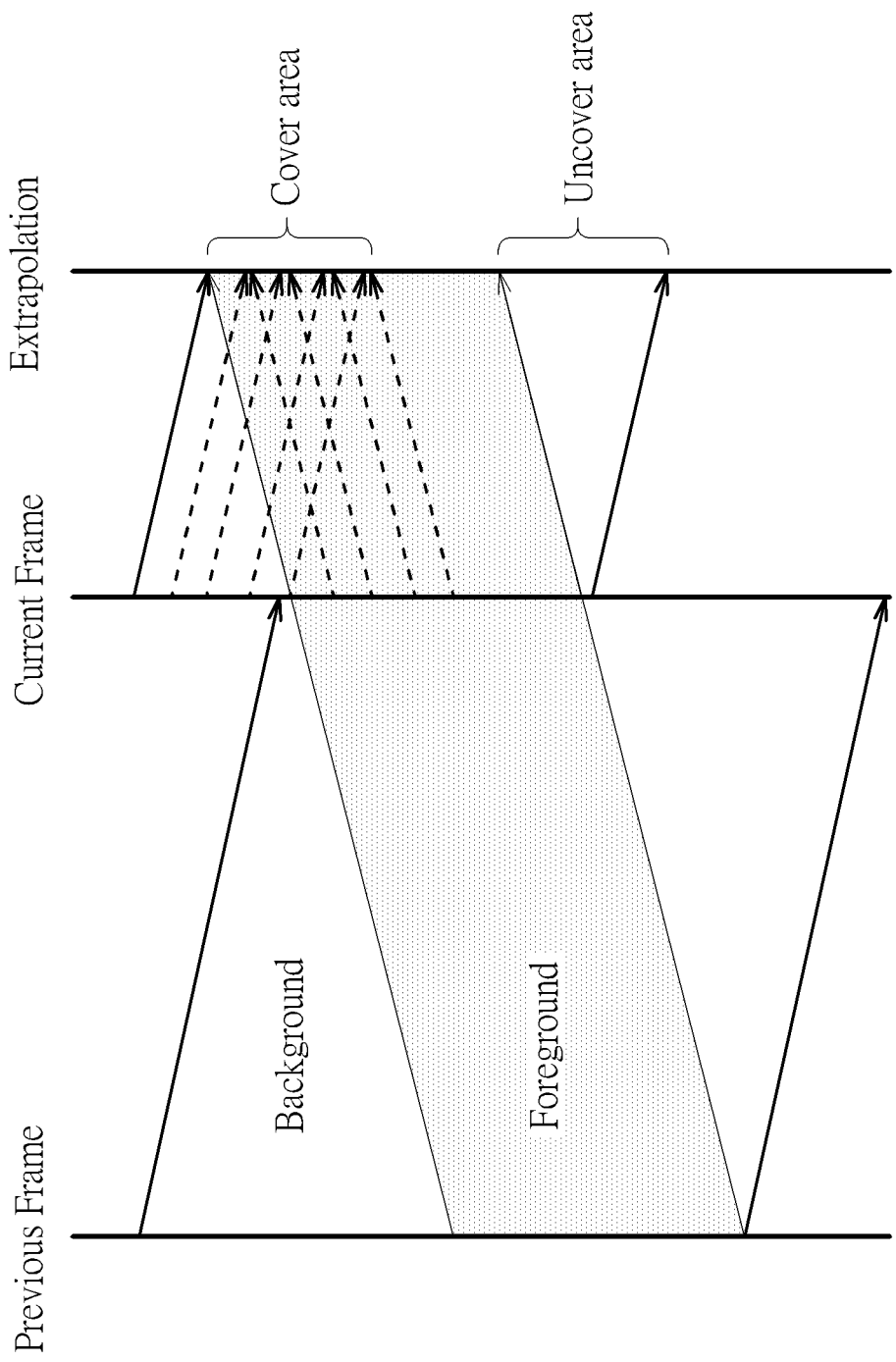
FIG. 3 is a schematic diagram of an extrapolated frame generated based on a previous frame and a current frame according to an embodiment of the present invention.

FIG. 3 is a schematic diagram of an extrapolated frame generated based on a previous frame and a current frame according to an embodiment of the present invention. As shown in FIG. 3, the displayed image may include a background object moving downward and a foreground object moving upward. These moving objects may generate MVs at the current frame, and these MVs are projected to the extrapolation phase subsequent to the current frame.

After the projections, the extrapolated frame has a cover area and an uncover area. In the cover area, the original background image in the previous frame is covered by the foreground object in the extrapolated frame, and each block may be projected by 2 or more MVs. As shown in FIG. 3, there may be at least one foreground MV and at least one background MV projected to a block in the cover area. In order to find the correct image of this block, the video processor should select a correct MV from the MVs projected to this block as the final MV, e.g., select a foreground MV in the embodiment shown in FIG. 3.

In the uncover area, the original foreground object in the previous frame is removed to uncover the background image in the extrapolated frame, and each block may not be projected by any MV, as shown in FIG. 3. In a conventional interpolation case, the correct background image in the uncover area may be taken from a subsequent input frame. However, in the extrapolation case, there is no subsequent frame for reference. Therefore, in order to find the correct image of the block in the uncover area, the video processor 106 should produce one or more MVs for the block to select the final MV for motion compensation.

Figure 4:
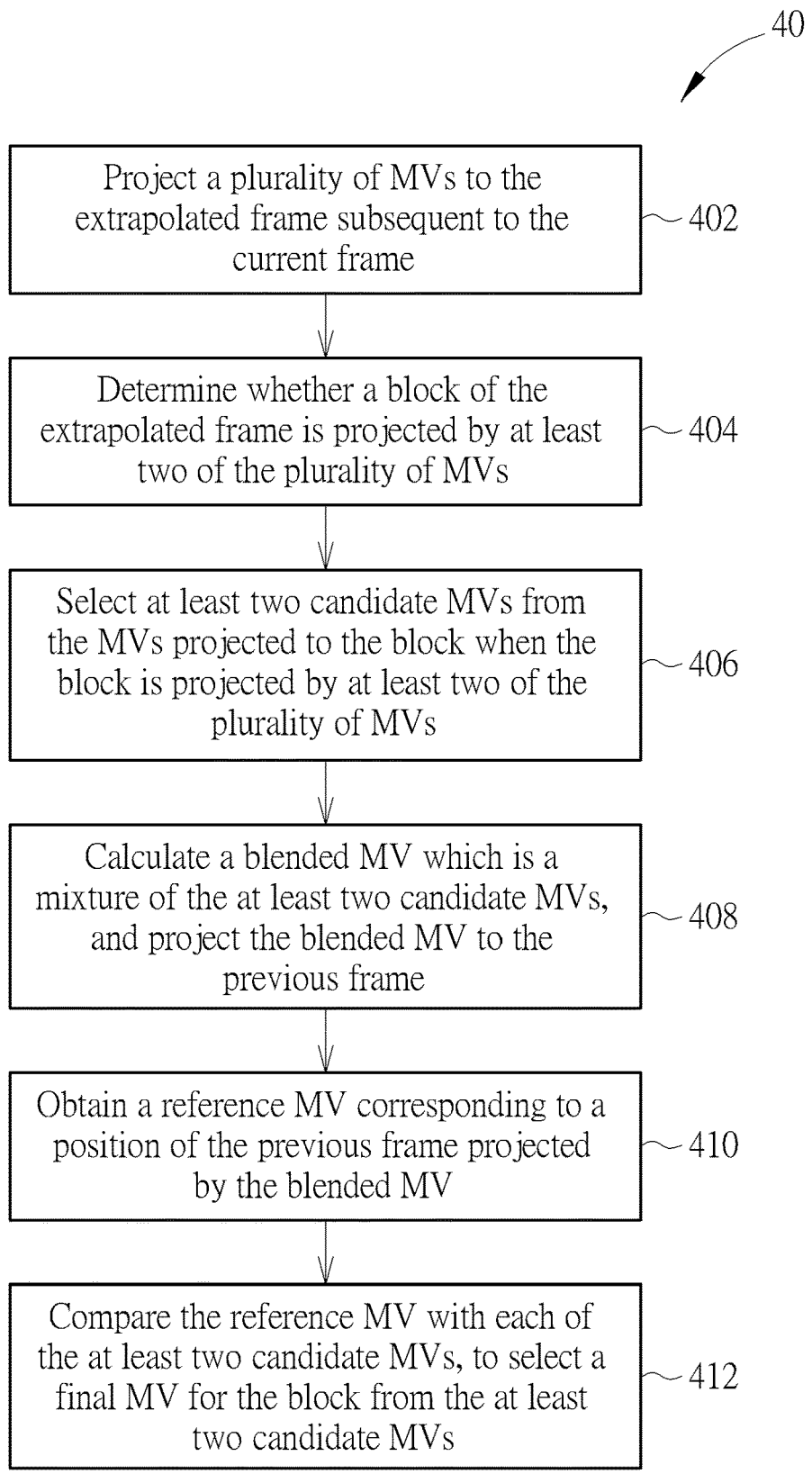
FIG. 4 is a flowchart of an image processing process according to an embodiment of the present invention.

FIG. 4 is a flowchart of an image processing process 40 according to an embodiment of the present invention. The image processing process 40 may be implemented in a video processor, such as the video processor 106 shown in FIG. 1, for generating an extrapolated frame according to a previous frame and a current frame. More specifically, the image processing process 40 is a detailed implementation of selecting the final MV for a block in the cover area. As shown in FIG. 4, the image processing process 40 includes the following steps:

Step 402: Project a plurality of MVs to the extrapolated frame subsequent to the current frame.

Step 404: Determine whether a block of the extrapolated frame is projected by at least two of the plurality of MVs.

Step 406: Select at least two candidate MVs from the MVs projected to the block when the block is projected by at least two of the plurality of MVs.

Step 408: Calculate a blended MV which is a mixture of the at least two candidate MVs, and project the blended MV to the previous frame.

Step 410: Obtain a reference MV corresponding to a position of the previous frame projected by the blended MV.

Step 412: Compare the reference MV with each of the at least two candidate MVs, to select a final MV for the block from the at least two candidate MVs.

In the extrapolation operation, the MVs are projected to the extrapolation phase to generate the extrapolated frame subsequent to the current frame. After the projections, the video processor 106 may determine how many MVs are projected to each block of the extrapolated frame, to determine whether a block is projected by at least two MVs. In this embodiment, the block is included in the cover area, and it could be found that there are more than two MVs projected to this block. The video processor 106 may further select at least two candidate MVs from the projected MVs.

In an embodiment, the video processor 106 may select two candidate MVs from those MVs projected to the block. Preferably, the two candidate MVs may represent the foreground image and the background image, respectively, so that the final image of the block may be selected from the foreground image or the background image by taking a correct final MV. For example, two of the MVs projected to the block having the maximum difference value may be selected as the candidate MVs. Since these two MVs have the maximum difference, they may usually be directed to different images, e.g., a foreground image and a background image.

Subsequently, the video processor 106 may calculate a blended MV which is a mixture of the two candidate MVs, and project the blended MV to the previous frame. In an embodiment, the two selected MVs may be averaged to generate the blended MV. In other words, the blended MV may have an average motion of the two candidate MVs. In another embodiment, a weighting value may be applied to blend the two candidate MVs to generate the blended MV. The weighting value may be determined according to, for example, the global MV of the current frame or the previous frame and/or the difference value between the candidate MVs.

The blended MV is then projected to the previous frame. At the position of the previous frame to which the blended MV is projected, the video processor 106 may obtain the MV at the position as a reference MV. Therefore, the reference MV may indicate the motion of the block at the position where the blended MV is projected. For example, if the position of the previous frame where the blended MV is projected has a background image, the reference MV may be a background MV. Note that the reference MV for a block in the cover area may usually be a background MV.

In another embodiment, in order to determine the reference MV more robustly, the video processor 106 may calculate an average motion of multiple blocks at or near the position where the blended MV is projected.

Subsequently, the video processor 106 may take the reference MV to be compared with each of the candidate MVs, to select a final MV for the block from the candidate MVs. Supposing that the candidate MVs include a background MV and a foreground MV, the video processor 106 may compare the reference MV with the background MV to generate a first difference value of MVs, and compare the reference MV with the foreground MV to generate a second difference value of MVs. When the first difference value is greater than the second difference value, the foreground MV having a smaller difference value will be selected as the final MV; or when the second difference value is greater than the first difference value, the background MV having a smaller difference value will be selected as the final MV. As mentioned above, the reference MV for a block in the cover area may usually be a background MV; hence, the foreground MV should be selected as the final MV since the difference of the foreground MV and the reference MV is usually larger than the difference of two background MVs.

Figure 5:
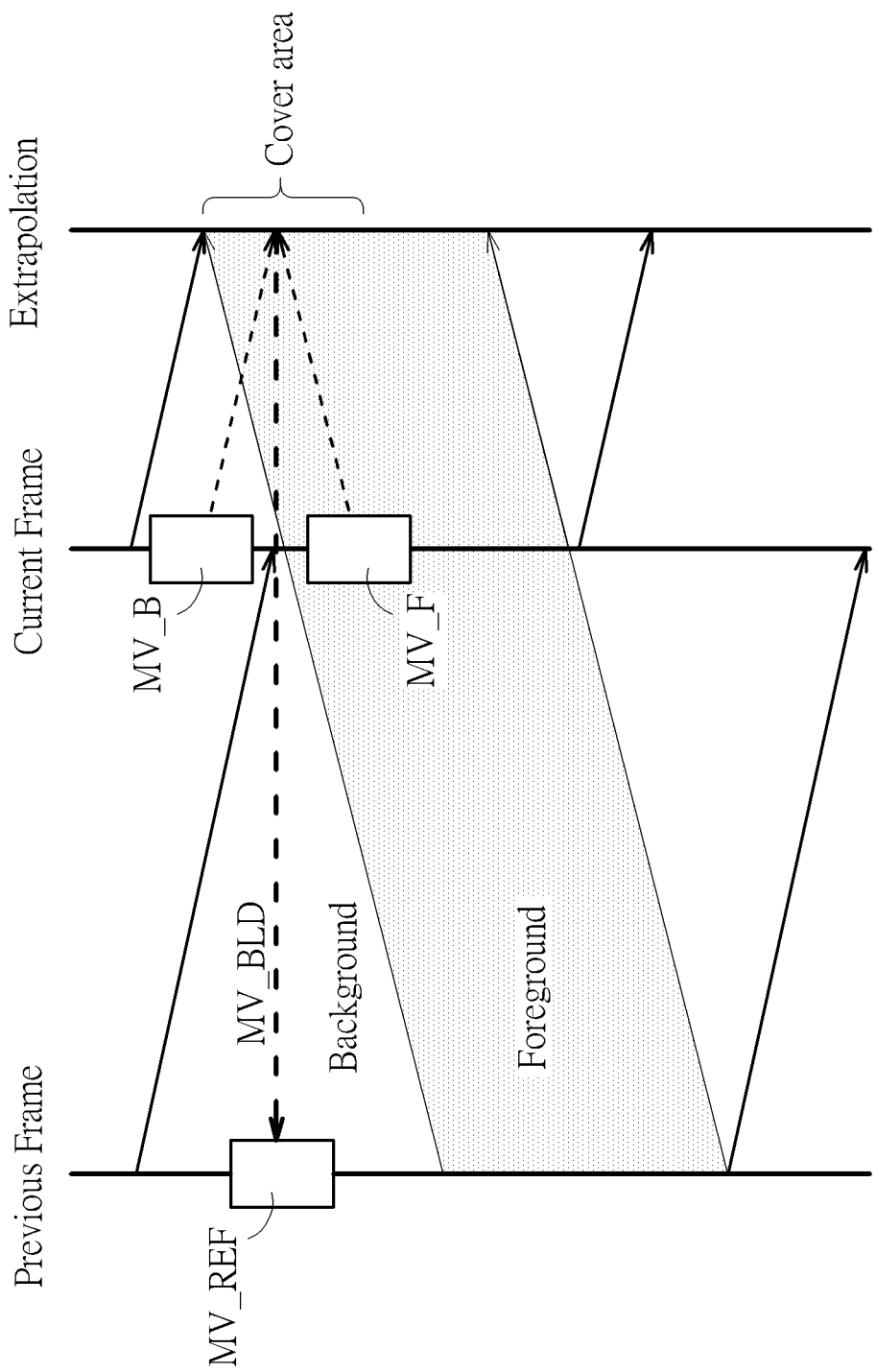
FIG. 5 illustrates the operations of determining the final MV for the block in the cover area.

FIG. 5 illustrates the operations of determining the final MV for the block in the cover area. As shown in FIG. 5, the movements of the background and foreground objects are identical to those shown in FIG. 3. In the cover area of the extrapolated frame, there may be a background MV (e.g., MV_B) and a foreground MV (e.g., MV_F) projected to each block. The MVs MV_B and MV_F may be regarded as the candidate MVs. If there are more than two MVs projected to a block, two of these projected MVs may be taken as the candidate MVs. The blended MV MV_BLD of the MVs MV_B and MV_F is then generated and projected to a position of the previous frame. The MV at this position is taken as the reference MV (e.g., MV_REF), which is a background MV in this embodiment. Subsequently, the reference MV is compared with the MVs MV_B and MV_F. The foreground MV MV_F has a larger difference with the reference MV MV_REF, and thus will be selected as the final MV for the block. As shown in FIG. 5, the cover area of the extrapolated frame is an area covered by the foreground object, and thus the foreground MV MV_F may be the correct final MV for the block in the cover area. Based on the image processing process 40, a foreground image as directed by the foreground MV MV_F may be correctly obtained to generate the extrapolated image in this block.

Figure 6:
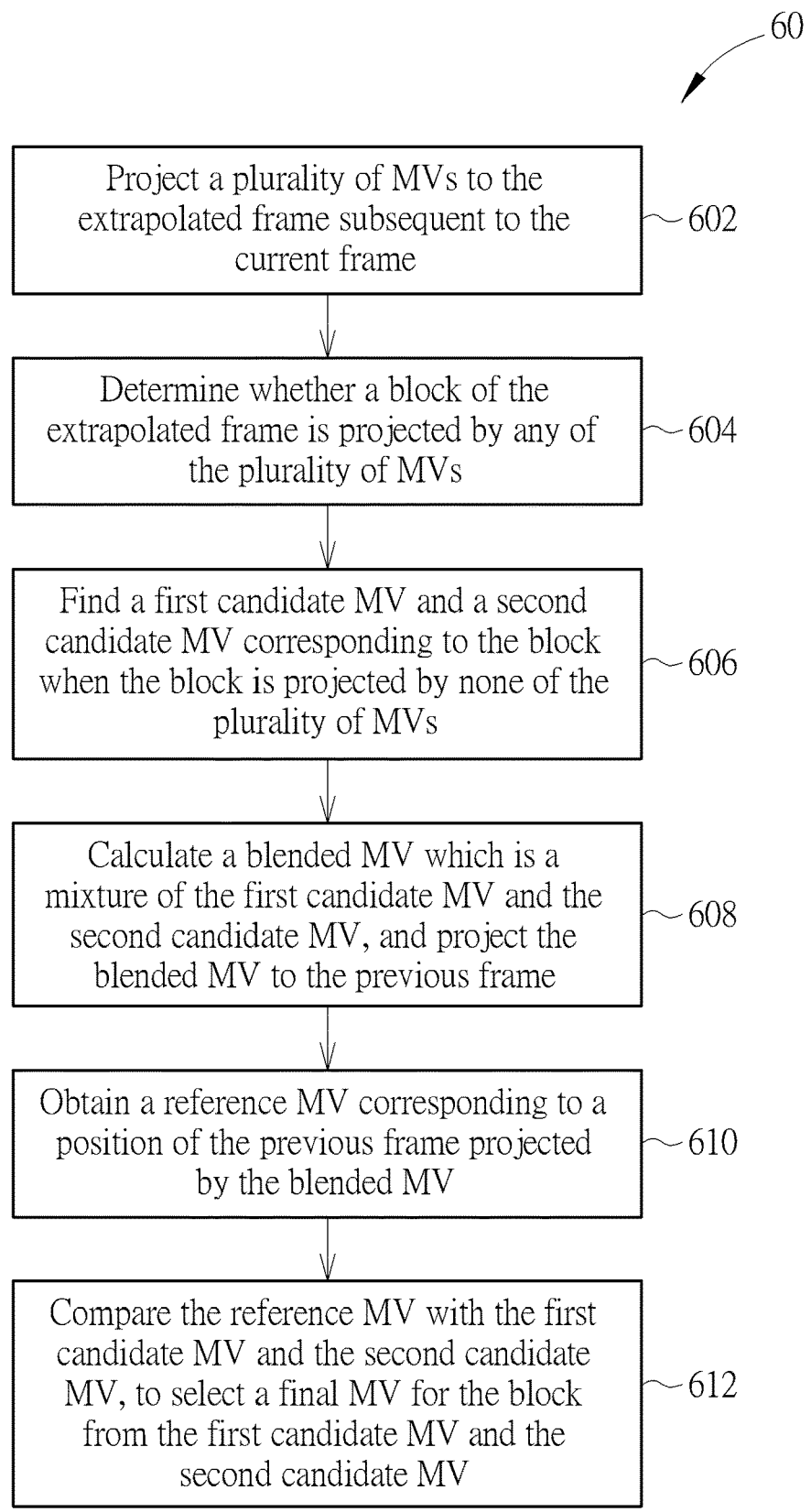
FIG. 6 is a flowchart of an image processing process according to an embodiment of the present invention.

FIG. 6 is a flowchart of an image processing process 60 according to an embodiment of the present invention. The image processing process 60 may be implemented in a video processor, such as the video processor 106 shown in FIG. 1, for generating an extrapolated frame according to a previous frame and a current frame. More specifically, the image processing process 60 is a detailed implementation of selecting the final MV for a block in the uncover area. As shown in FIG. 6, the image processing process 60 includes the following steps:

Step 602: Project a plurality of MVs to the extrapolated frame subsequent to the current frame.

Step 604: Determine whether a block of the extrapolated frame is projected by any of the plurality of MVs.

Step 606: Find a first candidate MV and a second candidate MV corresponding to the block when the block is projected by none of the plurality of MVs.

Step 608: Calculate a blended MV which is a mixture of the first candidate MV and the second candidate MV, and project the blended MV to the previous frame.

Step 610: Obtain a reference MV corresponding to a position of the previous frame projected by the blended MV.

Step 612: Compare the reference MV with the first candidate MV and the second candidate MV, to select a final MV for the block from the first candidate MV and the second candidate MV.

According to the image processing process 60, the video processor 106 is configured to find correct final MVs for blocks included in the uncover area. Referring back to FIG. 3, as for a block in the uncover area, the image is usually a background image. The image data of this block may exist in an input frame next to the extrapolated frame, but cannot be taken to produce the image in this block in the extrapolation process based on the previous frame and current frame since both the previous frame and current frame for extrapolation are previous to the extrapolated frame.

In the image processing process 40 for the cover area as described above, at least two of the projected MVs are selected as candidate MVs for a block. As for the uncover area, since there is no MV projected to a block, the video processor 106 is requested to find two candidate MVs for the block, so that the final MV may be selected from these two candidate MVs. After the two candidate MVs are obtained, the blended MV is calculated by blending the candidate MVs (e.g., by averaging the candidate MVs or calculating with weighting) and projected to the previous frame to find out the reference MV. In the similar manner, the reference MV at the projected position is obtained, and then the reference MV is compared with the two candidate MVs to select the final MV from the two candidate MVs based on the comparison result.

In an embodiment, the candidate MVs for each block of the uncover area may be obtained as follows. As for a specific block of the uncover area, the video processor 106 may project a zero MV from the specific block to the current frame, and obtain a specific MV at a first position of the current frame to which the zero MV is projected. This specific MV is then used to be projected from the specific block to the current frame, to obtain a second position of the current frame to which the specific MV is projected. The MV at the second position is thereby taken as the first candidate MV. Subsequently, the first candidate MV is used to be projected from the specific block to the current frame, to obtain a third position of the current frame to which the first candidate MV is projected. The MV at the third position is thereby taken as the second candidate MV. Therefore, with the first candidate MV and the second candidate MV, the video processor 106 may proceed with subsequent steps to select the final MV from these two candidate MVs.

Note that in the uncover case, the first candidate MV or the second candidate MV having less difference with the reference MV will be selected as the final MV. That is, suppose that the first candidate MV and the reference MV have a first difference value, and that the second candidate MV and the reference MV have a second difference value. The first candidate MV is selected as the final MV if the first difference value is smaller than the second difference value; or the second candidate MV is selected as the final MV if the second difference value is smaller than the first difference value. This determination method is different from the case of cover area as described above.

Figure 7:
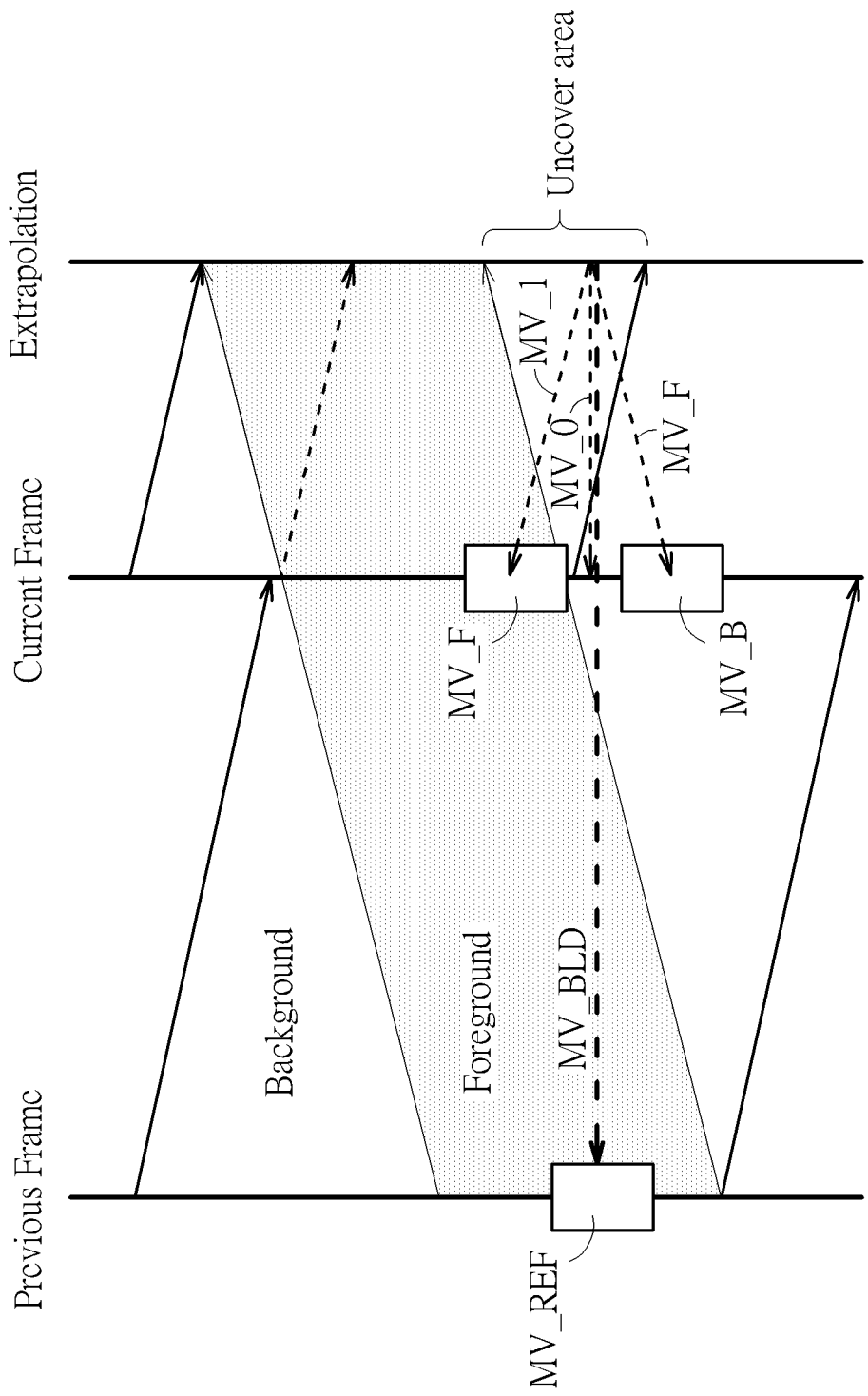
FIG. 7 illustrates the operations of determining the final MV for the block in the uncover area.

FIG. 7 illustrates the operations of determining the final MV for the block in the uncover area. As shown in FIG. 7, the movements of the background and foreground objects are identical to those shown in FIG. 3. In the uncover area of the extrapolated frame, there may be no MV projected to each block. As a result, the video processor 106 may project a zero MV MV_0 from a block of the uncover area to the current frame, to determine that the projected position has a background MV MV_1. This background MV MV_1 is then used to be projected from the block of the uncover area to the current frame, to direct to a foreground position of the current frame. The foreground MV MV_F at this foreground position may be taken as a first candidate MV. This foreground MV MV_F is further used to be projected from the block of the uncover area to the current frame, to direct to a background position of the current frame. The background MV MV_B at this background position may be taken as a second candidate MV.

In this manner, the first candidate MV and the second candidate MV are obtained, and these two candidate MVs may include one foreground MV and one background MV generally. These two candidate MVs are further compared with the reference MV MV_REF, which may be determined by using a blended MV MV_BLD generated by blending these two candidate MVs. In this embodiment, the reference MV MV_REF is a foreground MV; hence, the foreground MV MV_F, which has less difference with the reference MV MV_REF, may be selected as the final MV. As shown in FIG. 7, the uncover area of the extrapolated frame is an area showing the background image, and thus the foreground MV MV_F may be the correct final MV for the block in the uncover area. Based on the image processing process 60, a background image as directed by the foreground MV MV_F may be correctly obtained to generate the extrapolated image of this block.

Therefore, in the extrapolation process, the video processor 106 may project the MVs at the current frame to the extrapolated frame. Based on the projection result, the video processor 106 may determine how many MVs projected to each block of the extrapolated frame. If there are more than two MVs projected to a block, this block may be determined to be in the cover area, and the image processing process 40 is applied to determine the final MV for this block. If there is no MV projected to a block, this block may be determined to be in the uncover area, and the image processing process 60 is applied to determine the final MV for this block. If there is only one MV projected to a block, this projected MV will be taken as the final MV for this block. Therefore, in the motion compensation operation, the image of each block may be taken from the current frame and/or the previous frame based on the corresponding final MV, so as to construct the entire image of the extrapolated frame.

Please note that the present invention aims at providing an image processing method for frame extrapolation. Those skilled in the art may make modifications and alterations accordingly. For example, the MVs to be projected to the extrapolated frame may be the MVs at the current frame as in the above embodiment. In another embodiment, the MVs to be projected to the extrapolated frame may also include the MVs at the previous frame, which may improve the completeness of MV selection. In addition, in the above embodiment, the two candidate MVs include one background MV and one foreground MV in general, but this is not necessarily the case. In another embodiment, there may be two different foreground objects moving through a series of image frames, and the candidate MVs may be taken from two different foreground MVs. Note that the algorithm of the video processor 106 may not need to determine whether each MV belongs to the background or foreground. The above image processing processes for the cover area and the uncover area can usually find out the correct MV for motion compensation without considering whether the associated MVs are of foreground or background motions.

To sum up, the present invention provides a novel image processing method for performing MEMC of an extrapolated frame based on a previous frame and a current frame. According to the present invention, multiple MVs are projected to the extrapolated frame. The blocks projected by more than two MVs are classified into a cover area, and the blocks not projected by any MV are classified into an uncover area. As for each block in the cover area, two of the projected MVs are taken as the candidate MVs, and the final MV is obtained by comparing these candidate MVs with the reference MV. As for each block in the uncover area, the zero MV is projected to the current MV, to iteratively generate two candidate MVs, and the final MV is obtained by comparing these candidate MVs with the reference MV. The reference MV may be obtained by blending the candidate MVs to generate a blended MV and projecting the blended MV to the previous MV. As a result, correct MVs may be found in the motion estimation for extrapolation, and then the motion compensation for extrapolation may be performed based on the correct MVs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method for a video processor, for generating an extrapolated frame according to a previous frame and a current frame, the method comprising:
projecting a plurality of motion vectors (MVs) to the extrapolated frame subsequent to the current frame;
determining whether a block of the extrapolated frame is projected by at least two of the plurality of MVs;
selecting at least two candidate MVs from the MVs projected to the block when the block is projected by at least two of the plurality of MVs;
calculating a blended MV which is a mixture of the at least two candidate MVs, and projecting the blended MV to the previous frame;
obtaining a reference MV corresponding to a position of the previous frame projected by the blended MV; and
comparing the reference MV with each of the at least two candidate MVs, to select a final MV for the block from the at least two candidate MVs.

2. The image processing method of claim 1, wherein the at least two candidate MVs comprise a first candidate MV and a second candidate MV, and the step of comparing the reference MV with each of the at least two candidate MVs to select the final MV for the block from the at least two candidate MVs comprises:
comparing the reference MV with the first candidate MV to generate a first difference value;
comparing the reference MV with the second candidate MV to generate a second difference value; and
selecting the first candidate MV as the final MV when the first difference value is greater than the second difference value, or selecting the second candidate MV as the final MV when the second difference value is greater than the first difference value.

3. The image processing method of claim 1, wherein the step of calculating the blended MV which is the mixture of the at least two candidate MVs comprises:
calculating the blended MV by averaging the at least two candidate MVs.

4. The image processing method of claim 1, wherein the step of calculating the blended MV which is the mixture of the at least two candidate MVs comprises:
applying a weighting value to blend the at least two candidate MVs to obtain the blended MV, wherein the weighting value is determined according to at least one of a global MV and a difference value between the at least two candidate MVs.

5. The image processing method of claim 1, wherein the step of selecting the at least two candidate MVs from the MVs projected to the block comprises:
selecting a first MV and a second MV as the at least two candidate MVs, wherein the first MV and the second MV have a maximum difference value among the MVs projected to the block.

6. The image processing method of claim 1, wherein the reference MV corresponding to the position of the previous frame indicates a motion of a block at the position or an average motion of a plurality of blocks near the position.

7. A video processor, configured to generate an extrapolated frame according to a previous frame and a current frame by performing steps of:
projecting a plurality of motion vectors (MVs) to the extrapolated frame subsequent to the current frame;
determining whether a block of the extrapolated frame is projected by at least two of the plurality of MVs;
selecting at least two candidate MVs from the MVs projected to the block when the block is projected by at least two of the plurality of MVs;
calculating a blended MV which is a mixture of the at least two candidate MVs, and projecting the blended MV to the previous frame;
obtaining a reference MV corresponding to a position of the previous frame projected by the blended MV; and
comparing the reference MV with each of the at least two candidate MVs, to select a final MV for the block from the at least two candidate MVs.

8. The video processor of claim 7, wherein the at least two candidate MVs comprise a first candidate MV and a second candidate MV, and the step of comparing the reference MV with the at least two candidate MVs to select the final MV for the block from the at least two candidate MVs comprises:
comparing the reference MV with the first candidate MV to generate a first difference value;
comparing the reference MV with the second candidate MV to generate a second difference value; and
selecting the first candidate MV as the final MV when the first difference value is greater than the second difference value, or selecting the second candidate MV as the final MV when the second difference value is greater than the first difference value.

9. The video processor of claim 7, wherein the step of calculating the blended MV which is the mixture of the at least two candidate MVs comprises:
calculating the blended MV by averaging the at least two candidate MVs.

10. The video processor of claim 7, wherein the step of calculating the blended MV which is the mixture of the at least two candidate MVs comprises:
applying a weighting value to blend the at least two candidate MVs to obtain the blended MV, wherein the weighting value is determined according to at least one of a global MV and a difference value between the at least two candidate MVs.

11. The video processor of claim 7, wherein the step of selecting the at least two candidate MVs from the MVs projected to the block comprises:
selecting a first MV and a second MV as the at least two candidate MVs, wherein the first MV and the second MV have a maximum difference value among the MVs projected to the block.

12. The video processor of claim 7, wherein the reference MV corresponding to the position of the previous frame indicates a motion of a block at the position or an average motion of a plurality of blocks near the position.

13. An image processing method for a video processor, for generating an extrapolated frame according to a previous frame and a current frame, the method comprising:
projecting a plurality of motion vectors (MVs) to the extrapolated frame subsequent to the current frame;
determining whether a block of the extrapolated frame is projected by any of the plurality of MVs;
finding a first candidate MV and a second candidate MV corresponding to the block when the block is projected by none of the plurality of MVs;
calculating a blended MV which is a mixture of the first candidate MV and the second candidate MV, and projecting the blended MV to the previous frame;
obtaining a reference MV corresponding to a position of the previous frame projected by the blended MV; and
comparing the reference MV with the first candidate MV and the second candidate MV, to select a final MV for the block from the first candidate MV and the second candidate MV.

14. The image processing method of claim 13, wherein the step of comparing the reference MV with the first candidate MV and the second candidate MV to select the final MV for the block from the first candidate MV and the second candidate MV comprises:
comparing the reference MV with the first candidate MV to generate a first difference value;
comparing the reference MV with the second candidate MV to generate a second difference value; and
selecting the first candidate MV as the final MV when the first difference value is smaller than the second difference value, or selecting the second candidate MV as the final MV when the second difference value is smaller than the first difference value.

15. The image processing method of claim 13, wherein the step of calculating the blended MV which is the mixture of the first candidate MV and the second candidate MV comprises:
calculating the blended MV by averaging the first candidate MV and the second candidate MV.

16. The image processing method of claim 13, wherein the step of calculating the blended MV which is the mixture of the first candidate MV and the second candidate MV comprises:
applying a weighting value to blend the first candidate MV and the second candidate MV to obtain the blended MV, wherein the weighting value is determined according to at least one of a global MV and a difference value of the first candidate MV and the second candidate MV.

17. The image processing method of claim 13, wherein the step of finding the first candidate MV and the second candidate MV corresponding to the block comprises:
projecting a zero MV from the block to a first position of the current frame, to obtain a third MV at the first position of the current frame;
projecting the third MV from the block to a second position of the current frame;
obtaining the first candidate MV at the second position projected by the third MV;
projecting the first candidate MV from the block to a third position of the current frame; and
obtaining the second candidate MV at the third position projected by the first candidate MV.

18. The image processing method of claim 13, wherein the reference MV corresponding to the position of the previous frame indicates a motion of a block at the position or an average motion of a plurality of blocks near the position.

19. A video processor, configured to generate an extrapolated frame according to a previous frame and a current frame by performing steps of:
projecting a plurality of motion vectors (MVs) to the extrapolated frame subsequent to the current frame;
determining whether a block of the extrapolated frame is projected by any of the plurality of MVs;
finding a first candidate MV and a second candidate MV corresponding to the block when the block is projected by none of the plurality of MVs;
calculating a blended MV which is a mixture of the first candidate MV and the second candidate MV, and projecting the blended MV to the previous frame;
obtaining a reference MV corresponding to a position of the previous frame projected by the blended MV; and
comparing the reference MV with the first candidate MV and the second candidate MV, to select a final MV for the block from the first candidate MV and the second candidate MV.

20. The video processor of claim 19, wherein the step of comparing the reference MV with the first candidate MV and the second candidate MV to select the final MV for the block from the first candidate MV and the second candidate MV comprises:
comparing the reference MV with the first candidate MV to generate a first difference value;
comparing the reference MV with the second candidate MV to generate a second difference value; and
selecting the first candidate MV as the final MV when the first difference value is smaller than the second difference value, or selecting the second candidate MV as the final MV when the second difference value is smaller than the first difference value.

21. The video processor of claim 19, wherein the step of calculating the blended MV which is the mixture of the first candidate MV and the second candidate MV comprises:
calculating the blended MV by averaging the first candidate MV and the second candidate MV.

22. The video processor of claim 19, wherein the step of calculating the blended MV which is the mixture of the first candidate MV and the second candidate MV comprises:
applying a weighting value to blend the first candidate MV and the second candidate MV to obtain the blended MV, wherein the weighting value is determined according to at least one of a global MV and a difference value of the first candidate MV and the second candidate MV.

23. The video processor of claim 19, wherein the step of finding the first candidate MV and the second candidate MV corresponding to the block comprises:
projecting a zero MV from the block to a first position of the current frame, to obtain a third MV at the first position of the current frame;
projecting the third MV from the block to a second position of the current frame;
obtaining the first candidate MV at the second position projected by the third MV;

projecting the first candidate MV from the block to a third position of the current frame; and obtaining the second candidate MV at the third position projected by the first candidate MV.

24. The video processor of claim 19, wherein the reference MV corresponding to the position of the previous frame indicates a motion of a block at the position or an average motion of a plurality of blocks near the position.

\* \* \* \* \*